Dec. 20, 1966   C. P. ERVIN   3,292,606
SPARK PLUGS
Filed Oct. 19, 1964
FIG.1
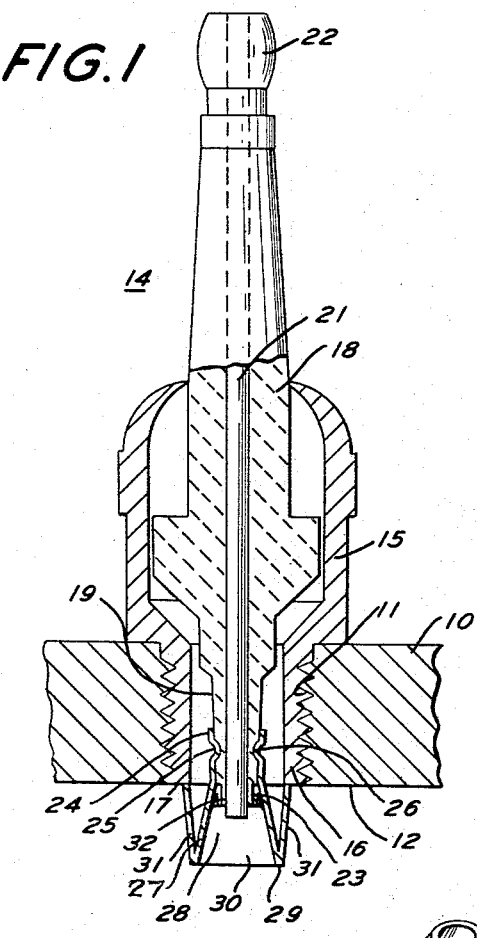
FIG.2
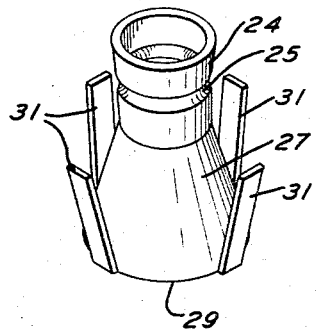
FIG.3
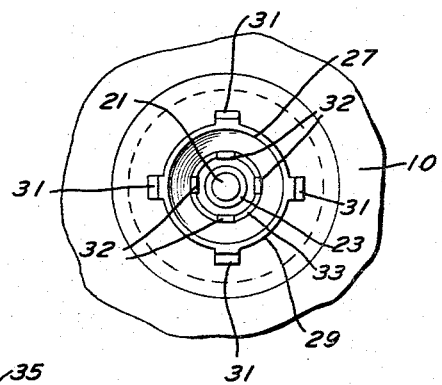
FIG.4
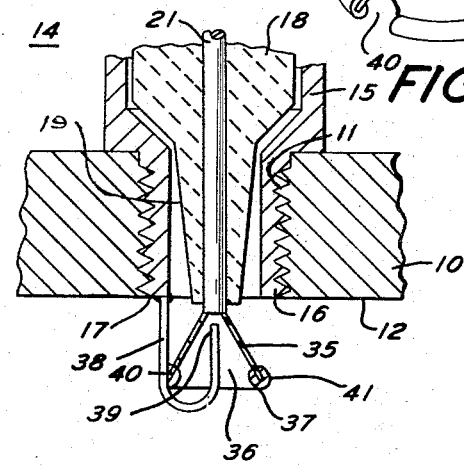
FIG.5
FIG.6
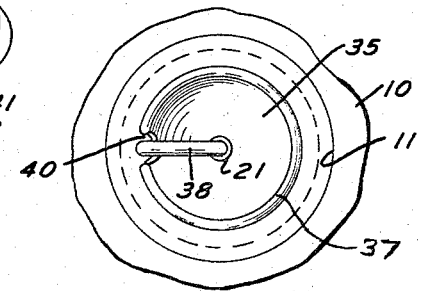
INVENTOR
CLARENCE P. ERVIN
BY
ATTORNEY

# United States Patent Office 3,292,606
Patented Dec. 20, 1966

3,292,606
SPARK PLUGS
Clarence P. Ervin, 6218 Greene St.,
Philadelphia, Pa. 19144
Filed Oct. 19, 1964, Ser. No. 404,877
9 Claims. (Cl. 123—169)

This invention relates to improvements in combustion in internal combustion engines and more particularly to constructions of spark plugs for this purpose.

The pressure, heat and amount of fuel to be burned in the cylinder all determine the rate of combustion, the fuel-air ratio in turn determining the amount of fuel. It is common practice in internal combustion engine operation, to employ a 15 to 1 ratio of air to fuel. If more air is used, a slower burning mixture results which in turn produces less instantaneous heat, and uneven ignition in the cylinder. With leaner mixtures detonation occurs, causing extreme pressures and temperatures which are much higher than those from a 15 to 1 ratio and can burn the valves and otherwise damage the engine.

Higher compression ratios can be employed to burn lean fuel mixtures but this requires heavier, costlier construction and additional servicing.

It is the principal object of the present invention to provide a spark plug which is capable of operation at much leaner fuel-air ratios with attendant advantages.

It is a further object of the present invention to provide a spark plug which provides in the combustion chamber a cup for radiating heat to the lean mixture flowing into it, the cup temporarily isolating a portion of the combustible mixture for initial combustion which combustion then spreads into the combustion chamber.

It is a further object of the present invention to provide a spark plug for improving the ignition in the combustion chamber thereby providing much greater fuel economy, cleaner, less smog producing exhaust, lower octane requirements of the fuel, longer engine life, decreased oil consumption and reduced likelihood of carburetor icing.

Other objects and advantageous features of the invention will be apparent from the description and claims.

The nature and characteristic features of the invention will be more readily understood from the following description taken in connection with the accompanying drawings forming part thereof, in which:

FIGURE 1 is an enlarged vertical central sectional view of one preferred embodiment of spark plug in accordance with the invention;

FIG. 2 is a perspective view, still further enlarged, of the cup removed from the spark plug shown in FIG. 1;

FIG. 3 is an underneath plan view, enlarged, of the structure of FIG. 1;

FIG. 4 is a fragmentary view, similar to FIG. 1, showing another preferred embodiment;

FIG. 5 is a perspective view, still further enlarged of the cup removed from the spark plug of FIG. 4; and FIG. 6 is an underneath plan view, enlarged, of the structure of FIG. 4.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1, 2 and 3 of the drawings the wall 10 of the combustion chamber of an internal combustion engine is shown having an internally threaded opening 11 terminating at an inner face 12.

The spark plug 14 in accordance with the invention includes a metallic body 15 with a hollow cylindrical threaded end portion 16 engaged in the opening 11, and having an end face 17. The spark plug 14 can have an internal porcelain insulator 18 with an inner end 19, and an end extension 23.

Within the porcelain insulator 18 a central conductor 21 is provided extending to a terminal connection 22 at its outer end and beyond the end extension 23 at its inner end.

The inner end 19 of the insulator 18 has in engagement therewith a sleeve 24 with an internal rib 25 seated in a groove 26 on the end 19.

The sleeve 24 has connected thereto and extending therefrom a frustoconical combustion cup 27 having an interior space 28 and a rim 29 surrounding a mouth portion 30. From the rim 29 a plurality of spaced legs 31 extend to and are preferably secured to the end face 17, the number and cross section of the legs 17 being selected to provide the desired limitation on heat transfer. Within the interior of the cup 27, and in radially spaced relation to the end extension 23 a plurality of contact strips 32, on a mounting ring 33, are secured to the cup 27, providing a surface gap.

Referring now to FIGS. 4, 5 and 6 of the drawings in the embodiment of the invention therein illustrated, the structure is generally similar to that previously described but with an air gap. The end 19 preferably extends slightly further beyond the plane of the face 12 and the conductor 21 has secured thereto a frustoconical combustion cup 35 with an interior space 36 and a terminal rim 37, preferably all beyond the face 12. A conductor 38, preferably of J-shape is secured to the end face 17 and has its inner end 39 in spaced relation to the conductor 21 and the cup 35. The cup 35 and rim 37 have a cut out 40 to avoid sparking between the conductor 38 and the cup 35 at this location. The cup 35 can have along the rim 37 a heat retaining ring 41 of refractory ceramic or metal.

It will be noted that the cup 27 has the spark gap therein between the contact strips 32 and conductor 21 within the interior space 28 and that the cup 35 has the spark gap therein between the conductor end 39 and conductor 21 and the cup 35 within the interior space 36.

In operation, as the combustible gas-air mixture enters the combustion chamber a portion thereof enters the space 28 or 36 where it is ignited by the spark at the spark gap. The cup 27 or 35 retains a portion of the heat from the prior firing, which also aids in the ignition of the portion of the fuel-air mixture in the space 28 or 36. From this location the burning spreads from the ignited portion in the space 28 or 36, which presents an enlarged cross sectional area of burning fuel, to the remainder of the combustible mixture in the cylinder.

The cups 27 and 36 by the nature of their supports are isolated or have a reduced heat dissipation through the body of the plug itself while at the same time the interior space 28 or 36 and the open mouth thereof does not choke off the propagation of the flame from the interior space into the remainder of the combustion chamber.

The size, volume, position, mouth opening and cup contour of the combustion cups 27 and 36 and the extent of projection into the combustion chamber may be varied in accordance with the particular type of combustion chamber, and the spaces with the combustion cups 27 and 36 are thus isolated by their walls from the shell or scavenge area.

The structure of the present invention as heretofore described is particularly suited for attaining the objects of the invention, so that smooth running, easy starting, and economical operation results.

I claim:

1. A spark plug having a body with threaded end for mounting the same in the wall of a combustion chamber and an internally disposed insulator, a combustion cup extending beyond the end of said body for interior exposure within the combustion chamber, said cup retaining a portion of the heat released in said combustion chamber, said cup having an outer terminal rim with an end opening and an interior space, closed inwardly of said rim for receiving and retaining for ignition a portion of the combustible gas in the combustion chamber, and said cup having spaced spark gap terminals disposed within said space inwardly of said rim and at an inner portion of said cup.

2. A spark plug as defined in claim 1 in which said combustion cup has a sleeve portion mounted on said insulator.

3. A spark plug as defined in claim 1 in which said combustion cup has mounting portions extending to the end of said body.

4. A spark plug as defined in claim 3 in which said combustion cup has certain of said spark gap terminals carried thereby.

5. A spark plug as defined in claim 1 in which said combustion cup has a sleeve portion mounted on said insulator, said cup has mounting portions extending from the outer rim to the end of said body, and said cup has spark gap terminals interiorly mounted thereon.

6. A spark plug as defined in claim 1 in which said combustion cup increases in cross sectional area from its interior to said outer rim.

7. A spark plug as defined in claim 1 in which said plug has a scavenge space between the body and the insulator and said interior space of said cup is separated by said cup from said scavenge space.

8. A spark plug having a body with threaded end for mounting the same in the wall of a combustion chamber and an internally disposed insulator, a combustion cup extending beyond the end of said body for interior exposure within the combustion chamber, said cup retaining a portion of the heat released in said combustion chamber, said cup having an outer rim with an interior space inwardly of said rim for receiving and retaining for ignition a portion of the combustible gas in the combustion chamber, and said cup having spaced spark gap terminals disposed within said space and inwardly of said rim said combustion cup being carried by a conductor extending through said insulator.

9. A spark plug having a body with threaded end for mounting the same in the wall of a combustion chamber and an internally disposed insulator, a combustion cup extending beyond the end of said body for interior exposure within the combustion chamber, said cup retaining a portion of the heat released in said combustion chamber, said cup having an outer rim with an interior space inwardly of said rim for receiving and retaining for ignition a portion of the combustible gas in the combustion chamber, and said cup having spaced spark gap terminals disposed within said space and inwardly of said rim, said insulator having a first electrical conductor therein, said combustion cup being secured to said conductor, a second electrical conductor being conducted to said body and extending within said body with its inner gap terminal in spaced relation to said first conductor.

References Cited by the Examiner

UNITED STATES PATENTS

| | | | |
|---|---|---|---|
| 1,326,599 | 12/1919 | Kelsey et al. | 123—169 X |
| 1,360,294 | 11/1920 | Hill | 123—169 X |
| 1,506,559 | 8/1924 | Bourcheix | 123—169 |
| 1,929,748 | 10/1933 | Little | 123—169 |
| 1,959,383 | 5/1934 | Nowosielski | 123—169 |
| 1,963,801 | 6/1934 | O'Marra | 123—169 |
| 1,983,445 | 12/1934 | Erny | 123—169 |
| 2,047,575 | 7/1936 | Burtnett | 123—169 |
| 2,126,442 | 8/1938 | Baud | 123—169 |
| 2,171,014 | 8/1939 | Thomen | 123—169 |
| 2,209,621 | 7/1940 | Carter | 123—169 |
| 2,642,054 | 6/1953 | Wright | 123—169 |

MARK NEWMAN, *Primary Examiner.*

LAURENCE M. GOODRIDGE, *Examiner.*

UNITED STATES PATENT OFFICE
CERTIFICATE OF CORRECTION

Patent No. 3,292,606

December 20, 1966

Clarence P. Ervin

It is hereby certified that error appears in the above numbered patent requiring correction and that the said Letters Patent should read as corrected below.

Column 4, line 19, for "conducted" read -- connected --.

Signed and sealed this 12th day of September 1967.

(SEAL)
Attest:

ERNEST W. SWIDER
Attesting Officer

EDWARD J. BRENNER
Commissioner of Patents